United States Patent [19]
Stern

[11] 3,936,930
[45] Feb. 10, 1976

[54] METHOD OF MAKING ELECTRICAL CONNECTIONS FOR LIQUID CRYSTAL CELLS

[75] Inventor: Herman Abraham Stern, Somerville, N.J.

[73] Assignee: RCA Corporation, New York, N.Y.

[22] Filed: May 6, 1974

[21] Appl. No.: 467,150

Related U.S. Application Data

[62] Division of Ser. No. 270,245, July 10, 1972, abandoned.

[52] U.S. Cl. ............... 29/592; 29/628; 174/68.5; 317/101 CE; 350/160 LC
[51] Int. Cl.² ......................................... H01S 4/00
[58] Field of Search ..... 350/160 LC; 29/25.13, 592, 29/471.9, 472.1, 471.1, 628, 25.1; 316/20; 117/212; 252/512; 174/68.5; 317/101 CE

[56] References Cited
UNITED STATES PATENTS

| | | |
|---|---|---|
| 3,077,511 | 2/1963 | Bohrer et al. ............ 174/68.5 |
| 3,647,532 | 3/1972 | Friedman et al. ............ 117/212 |
| 3,647,533 | 3/1972 | Hicks ............ 117/212 |
| 3,689,131 | 9/1972 | Klein et al. ............ 350/160 |
| 3,751,137 | 8/1973 | Fitzgibbons et al. ......... 350/160 LC |
| 3,771,855 | 11/1973 | Burns............ 350/160 LC |
| 3,776,769 | 12/1973 | Buck et al............ 117/212 |
| 3,778,126 | 12/1973 | Willson ............ 316/20 |

Primary Examiner—Roy Lake
Assistant Examiner—James W. Davie
Attorney, Agent, or Firm—Glenn H. Bruestle; Birgit E. Morris

[57] ABSTRACT

The cell comprises two spaced apart substrates and a plurality of terminals for the cell disposed along an exposed surface of one of the substrates. Electrodes are disposed on each of the substrates, and connector means for connecting one of the terminals on the one substrate and an electrode on the other substrate comprises a fused glass bump bridging the space between the two substrates and electrically connected to the one terminal and the electrode on the other substrate. The glass bump contains metal particles dispersed therethroughout to provide it with electrical conductive characteristics.

4 Claims, 4 Drawing Figures

METHOD OF MAKING ELECTRICAL CONNECTIONS FOR LIQUID CRYSTAL CELLS

This is a division of application Ser. No. 270,245, filed July 10, 1972, now abandoned.

BACKGROUND OF THE INVENTION

This invention relates to liquid crystal devices, and particularly to means for making electrical connections to the electrodes of such devices.

One known type of liquid crystal cell comprises a pair of oppositely disposed, spaced apart substrates having a liquid crystal material sandwiched therebetween. Each substrate has an electrode on the inside surface thereof, and the cell is turned on by applying a voltage between the electrodes.

To make electrical connections to each of the electrodes, metallized paths are provided on the inside surfaces of the substrates extending between the electrodes and edge portions of the substrate where terminal connections are made.

To provide access to the substrate inside surfaces at the substrate edges, it is the practice to extend an edge portion of each substrate beyond the corresponding edge of the other substrate. For example, if the cell comprises upper and lower substrates, on one side of the cell the lower substrate extends beyond the edge of the upper substrate, thereby exposing a portion of the inside surface of the lower substrate, while on another side of the cell, an edge portion of the upper substrate extends beyond the edge of the lower substrate, thereby exposing a portion of the inside surface of the upper substrate. Thus, terminal connections can be made to metallized paths which terminate at the exposed portions of the substrates at the two sides of the cell.

To simplify mounting and socketing of the cell, it is sometimes preferred that all the terminal connections be made to a single side only of the cell and to one only of the substrates. To accomplish this, it is necessary that an electrical connection be provided between the electrode on the other substrate and the portion of the one substrate to which the terminal connections are made.

An object of this invention is to provide such connection in a simple, reliable, and inexpensive manner.

DETAILED DESCRIPTION OF THE INVENTION

Figure 1:
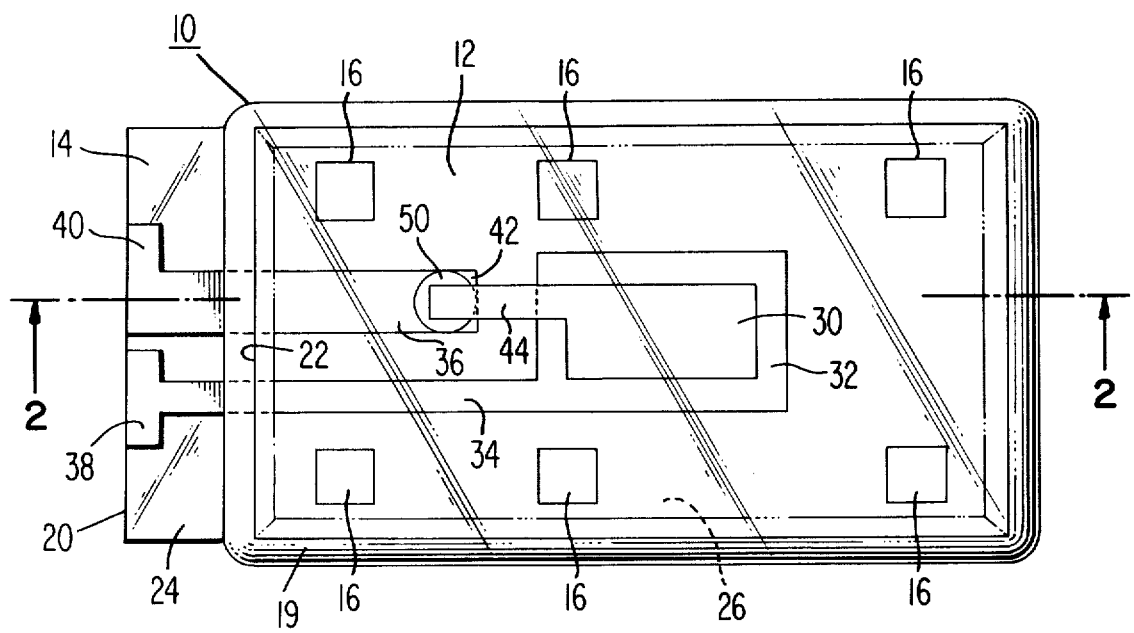
FIG. 1 is a plan view of a liquid crystal cell made in accordance with the instant invention.
Figure 2:
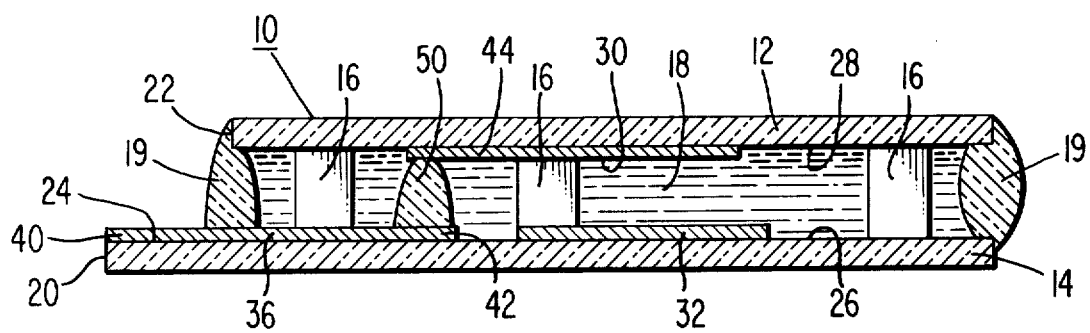
FIG. 2 is a sectional view taken along line 2-2 of FIG. 1.

With reference to FIGS. 1 and 2, a liquid crystal cell 10 is shown. The cell 10 comprises a pair of oppositely disposed substrates 12 and 14 of an insulating material, usually glass, maintained in spaced apart relation by means of a number of small shims 16 of a suitable material, preferably inorganic, such as mica, disposed slightly inwardly of the edges of the substrate 12. Sandwiched between the substrates 12 and 14 is a liquid crystal material 18 of any of the various known types. The spacing between the substrates is generally in the order of ½ mil. An hermetic seal is provided by means of a fused glass joint 19 disposed between the substrates along the edge of the substrate 12.

As shown, an edge 20 of the substrate 14 extends beyond the edge 22 of the substrate 12 thereby exposing a portion 24 of the surface 26 of the substrate 14.

Disposed on the inside surface 28 and 26 of each substrate 12 and 14, respectively, is a rectangular conductive layer or electrode 30 and 32, respectively, the electrode 32 being slightly larger and overlapping the electrode 30, as shown in FIG. 1. The electrodes can be of various materials normally used in such cells, such as aluminum, tin oxide, indium oxide, or the like. Conductive paths 34 and 36 are disposed on the inside surface 26 of the substrate 14, the path 34 extending between the electrode 32 and a conductive terminal pad 38 on the exposed surface portion 24, and the path 36 extending from a conductive terminal pad 40 on the exposed surface portion 24 to an inner path end 42 which is spaced from the electrode 32. A metallized path 44 is also provided on the inside surface 28 of the substrate 12 connected to the electrode 30 thereon. This path 44 terminates short of the edge 22 of the substrate 12 but overlaps the metallized path 36 on the substrate 14.

The paths 34 and 36 extend beneath the glass joint 19. Preferably, the paths 34 and 36 are of the same material as the electrode 32, and have such a small thickness (equal to that of the electrode 32), in the order of 0.3 microns, as not to provide any problems with respect to hermetically sealing the cell, as described hereinafter.

To provide an interconnection between the two metal paths 36 and 44, a mass 50 of conductive material in the form of a generally conical bump is disposed between the two substrates 12 and 14 in contact with the two paths 36 and 44. The bump 50 is of a material, e.g., glass, which is bonded to each of the metal paths 36 and 44, and the bump 50 contains a quantity of metal particles, e.g., silver, disposed therewithin to provide the bump with electrical conductive characteristics. Since the liquid crystal material between the substrates 12 and 14 generally has a high electrical impedance, as known, the conductivity of the bump 50 is not critical and can be relatively high. In one embodiment, for example, the resistance of the liquid crystal material in its active or scattering state is in the order of $5 \times 10^8$ ohms, and the resistance of the bump is in the order of $5 \times 10^6$ ohms.

In operation of the device, voltage is applied between the two terminal pads 38 and 40 by means of suitable socketing means, not shown, whereby a voltage is impressed between the two electrodes 30 and 32. In known fashion the voltage between the electrodes 30 and 32 affects the light transmitting characteristics of the liquid crystal material 18 between the electrodes.

The fabrication of the cell 10 is as follows.

Figure 3:
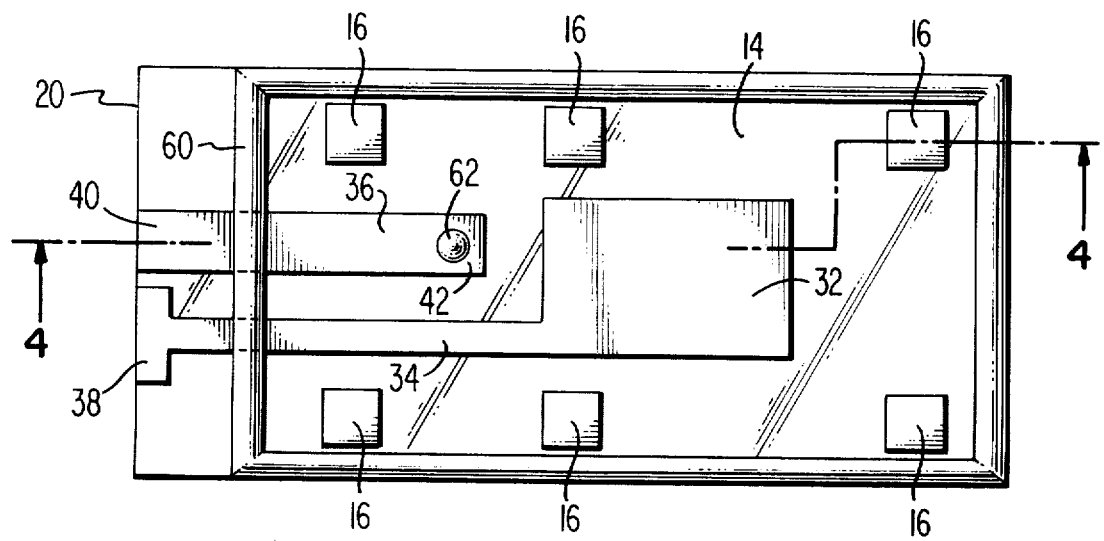
FIG. 3 is a plan view of one substrate of the cell shown in FIGS. 1 and 2 at one step in the fabrication of the cell.

Starting with the two substrates 12 and 14, generally of glass or some other suitable insulating material, the inside surfaces 26 and 28 thereof are coated by known means with a layer of a material, e.g., indium oxide, stanus oxide, aluminum, chromium, or the like, of which the electrodes 30 and 32 and the metal paths 34, 36 and 44 are to be formed. Thereafter, the coated layers are defined by known photolithographic techniques to provide these electrodes and metal paths. Using known techniques, such as silk screening, a bead 60 (FIGS. 3 and 4) of a known type of glass frit (i.e., a suspension of glass particles in a liquid vehicle of an organic solvent and an organic binder) is disposed on the inside surface 26 of the substrate 14 along three edges thereof and inwardly of the edge 20. Owing to the thinness of the metallic paths 34 and 36, there is little likelihood of spaces or voids being left between the bead 60 and the substrate 14 where the bead crosses the paths 34 and 36.

Thereafter, the substrate 14 is fired, at a temperature in the order of 480°C, to fusion bond the bead 60 to the inside surface 26 of the substrate 14 and to the surface of the paths 34 and 36.

A dot 62 (FIGS. 3 and 4) of a conductive ink is then placed on the substrate 14 directly on top of the path 36 adjacent to the inner end 42 thereof. The composition of the dot 62 is not critical, but it is preferably of a material that can be secured to the substrate 14 to prevent displacement thereof during subsequent processing steps. A preferred dot ink comprises a suspension of solder glass (i.e., low temperature melting glass such as lead glass) in a liquid vehicle comprising a suitable binder and solvent, and metallic particles to provide a degree of electrical conductivity in the dot. Inks of the type described are well known and commercially available.

By way of specific example, the ink can comprise finely ground particles of lead glass fine enough to pass through a 250 mesh screen; flake-like particles of silver; an organic binder such as lucite, nitrocellulose, methyl cellulose; and a solvent such as amyl acetate, toluene, butyl carbotol, or methyl ethyl ketone, the particular solvent used being one in which the particular binder used is soluble. The silver flakes are submicron in size and comprise 70% by weight of the solids in the ink, that is, of the silver and glass. Other conductive particles such as gold or other noble metals can be used. The amounts of the solvent and binder used are dependent upon the desired ink viscosity, which is dependent, in turn, upon the particular means used to apply the ink. Such means can comprise printing, inking using a suitable nib or pen, or silk screening. Means for preparing and applying such inks are known.

Thereafter the ink dot 62 is dried at a relatively low temperature, in the order of 150°C, to remove most of the solvent while not burning off the binder or fusing the glass constituent of the dot. Owing to the presence of the binder, the dot remains relatively securely bound to the substrate with little danger of the dot falling off the substrate during subsequent handling thereof.

Figure 4:
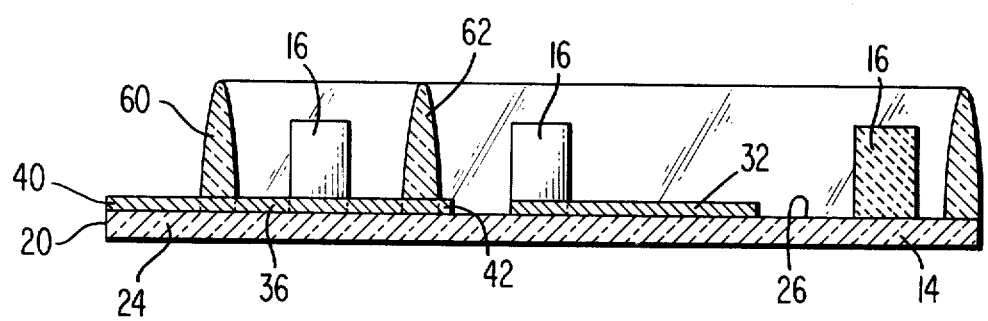
FIG. 4 is a sectional view taken along line 4-4 of FIG. 3.

As shown in FIG. 4, the mica spacer shims 16 are then disposed on the substrate 14 inside the bead 60. As shown, the shims 16 have a height somewhat less than that of the bead 60 and the dot 62. In one embodiment, for example, the spacers 16 have a height of ½ mil, while both the bead 60 and the dot 62 have a height in the order of 1½ mils.

The two substrates 12 and 14 are then disposed in face-to-face relation and in such position that the electrodes 30 and 32 are properly aligned with one another, and the dot 62 aligned with an end portion of the metallic path 44 on the substrate 12. Also, the edges of the substrate 12 contact the upper surface of the bead 60.

Thereafter, suitable clamping means or weights are provided to apply compressive pressure between the two substrates 12 and 14, and the cell is exposed to a temperature in the order of 520°C for a time sufficient to soften the bead 60 and the dot 62. The compressive pressure forces the two substrates 12 and 14 towards one another until further movement is prevented by contact of the substrate 12 with the shims 16. The movement of the substrates 12 and 14 towards one another causes lateral spreading of the softened bead 60 and dot 62. Preferably, the softening of the bead 60 and dot 62 is not so great as to cause or allow any more lateral movement thereof than is necessary to contain the mass thereof between the two substrates 12 and 14 and in contact therewith. Thus, for example, with a bead 60 having an initial thickness of 20 mils (in the drawing, the vertical scale is grossly exaggerated for convenience of illustration), the final thickness thereof is in the order of 40 mils. Likewise, the dot 62 which may have a diameter in the order of 10 mils when initially applied spreads to a diameter in the order of 20 mils.

Upon completion of the firing operation and cooling of the cell, the glass bead 60 provides a hermetic seal between the two substates 12 and 14, and the dot 62, now the bump 50 (FIG. 2), is fusion sealed to the two metallic paths 36 and 44.

To complete the cell, known means, not shown, are used to inject the liquid crystal material into the space defined by the substrates 12 and 14 and the bead 16. An example of a suitable process for filling liquid crystal cells is described in my co-pending application Ser. No. 155,845 filed June 23, 1971.

In another embodiment, not illustrated, substantially the entire inside surface 28 of the substrate 12 is coated with a conductive, electrode material. In this embodiment, the bump 50 is connected to such conductive coating, or electrode, and a separate conductive path, such as the path 44 on the substrate 12, as shown in FIG. 2, is not required.

I claim:

1. In a method of fabricating a liquid crystal cell, the improvement comprising:
   providing on a surface of a first glass substrate first and second spaced apart conductive layers,
   adhering to a portion of said first layer a slurry of glass in the form of a bump, said slurry having conductive particles therewithin,
   providing on a surface of a second glass substrate a third conductive layer,
   disposing said two substrates in face-to-face spaced apart relation with said second and third layers disposed in overlapped relation and with said bump disposed in alignment with a portion of said third layer, and
   simultaneously fusion bonding said bump to said first and third layers while maintaining a space between said substrates, said bump providing an electrical connection between said first and third layers and spanning the space between said substrates.

2. The method of claim 1 including the steps of:
   disposing a spacer element on one of said two substrates prior to said face-to-face disposing step, the height of said spacer being less than that of said bump, and
   moving said substrates towards one another during said fusion step until further inward movement is prevented by said spacer.

3. The method of claim 2 including the steps of:
   providing a glass bead on one of said substrates adjacent to the edge thereof prior to said face-to-face disposing step, said bead having a height greater than that of said spacer, and fusing said bead to the other of said substrates to form a joint between said substrates simultaneously with said fusion bonding step.

4. The method of claim 1 wherein said slurry includes solvent and a binder, said method including the step of removing said solvent while leaving said binder to adhere said bump to said first layer prior to said fusion bonding of said bump.

* * * * *